United States Patent [19]
Foster et al.

[11] Patent Number: 5,376,419
[45] Date of Patent: Dec. 27, 1994

[54] METHOD AND APPARATUS FOR SEAMING CARPETS

[75] Inventors: Scott L. Foster, Fremont; Howard G. McGaha, Pleasanton, both of Calif.

[73] Assignee: Orcon Corporation, Union City, Calif.

[21] Appl. No.: 206,030

[22] Filed: Mar. 3, 1994

Related U.S. Application Data

[63] Continuation of Ser. No. 867,126, Apr. 10, 1992, abandoned, which is a continuation of Ser. No. 522,263, May 11, 1990, Pat. No. 5,104,475.

[51] Int. Cl.$^5$ .................................................. B32B 3/00
[52] U.S. Cl. ........................................ 428/40; 428/347; 428/354; 156/304.4; 156/304.7; 427/208.8
[58] Field of Search ................. 156/304.1, 304.3, 304.4, 156/304.6, 304.7; 427/208, 208.2, 208.4, 208.6, 208.8; 428/57, 200, 343, 354, 355, 40, 347

[56] References Cited

U.S. PATENT DOCUMENTS

| | | | |
|---|---|---|---|
| 1,917,430 | 7/1933 | Clark | 156/804.4 X |
| 3,127,303 | 3/1964 | Neuhauser et al. | 161/39 |
| 3,523,176 | 8/1970 | Hill | 219/245 |
| 3,533,876 | 10/1970 | Burgess | 156/304.4 |
| 3,582,436 | 6/1971 | Bucher | 156/502 |
| 3,651,305 | 3/1972 | Shimota | 219/243 |
| 3,927,289 | 12/1975 | Prater | 219/245 |
| 3,969,564 | 7/1976 | Carder | 428/212 |
| 3,972,768 | 8/1976 | Hill | 156/545 |
| 4,075,377 | 2/1978 | Aitchison et al. | 428/95 |
| 4,404,246 | 9/1983 | Charbonneau et al. | 427/208 X |
| 4,416,713 | 11/1983 | Brooks | 156/304.4 X |
| 4,438,323 | 3/1984 | Milnes | 219/243 |
| 4,557,774 | 12/1985 | Hoopengardner | 156/71 |
| 4,699,686 | 10/1987 | Franke | 156/579 |
| 4,702,948 | 10/1987 | Sieber-Gadient | 427/208 X |
| 4,749,433 | 6/1988 | Johnston et al. | 156/304.7 X |
| 4,828,881 | 5/1989 | Brown et al. | 427/208 |

OTHER PUBLICATIONS

Sponge Cushion, Inc. Brochure entitled *SCI Dubl-Stik Carpet Installation System* dated 1986 (lower right hand corner of last page).

Sponge Cushion, Inc. Brochure entitled *Installation Instructions for Tred-Mor and Vigilant Series-Director and Class A Commercial Contract Cushion* dated Jun. 30, 1987.

*Primary Examiner*—David A. Simmons
*Assistant Examiner*—James J. Engel
*Attorney, Agent, or Firm*—Haverstock, Medlen & Carroll

[57] ABSTRACT

A novel carpet seaming tape and method for use in glue down carpet installations is provided. A carpet seaming tape having a paper carrier with a hot melt adhesive on its top surface and a pressure sensitive adhesive on its bottom surface is aligned beneath the abutting edges of two pieces of carpeting to be seamed, with the hot melt adhesive on top. The tape is attached to the floor using the pressure sensitive adhesive, the carpet pieces are removed and the floor is coated with general purpose adhesive everywhere except in those areas where the seaming tape has been attached. The carpet is replaced and realigned, and seaming is completed by using a seaming iron to melt the hot melt adhesive and pushing the edges of the carpeting pieces into the molten adhesive atop the carpet seaming tape so that the edges of the carpet closely abut each other.

20 Claims, 1 Drawing Sheet

METHOD AND APPARATUS FOR SEAMING CARPETS

This application is a continuation of copending U.S. patent application Ser. No. 07/867,126 filed on Apr. 10, 1992 (now abandoned), which is a continuation of copending U.S. patent application Ser. No. 07/522,263 filed May 11, 1990 which issued on Apr. 14, 1992 as U.S. Pat. No. 5,104,475.

FIELD OF THE INVENTION

The present invention relates to carpet installation. More particularly, this invention relates to a method and apparatus for seaming wall-to-wall carpets which are installed by gluing the carpet directly to an underlying substrate such as a floor or cushion.

DISCUSSION OF THE PRIOR ART

In the installation of wall-to-wall carpet, seaming is employed to join the adjacent abutting edges of carpeting. It is common for installers to create seams using the face seam technique. Using this technique, the carpet pieces to be joined are laid onto the floor with the carpet backing to the floor, the abutting edges of the carpet pieces are bent upwards. Conventional carpet seaming tape, having hot melt adhesive applied to the upper surface of a backing material, such as that described in U.S. Pat. No. 3,533,876 to Burgess, is centered along the length of the carpet edges to be joined with the backing to the floor and the hot melt adhesive facing the carpet backing. A hot iron is moved longitudinally along the length of the carpet seaming tape to melt the adhesive, and the backing of the carpet pieces are pressed down onto the tape, with the edges of the carpet pieces abutting, to form a closely fitting seam as the adhesive cools.

While this procedure has provided satisfactory seams in installations in which the carpet is subsequently stretched and attached in place using tack strips, it has not produced satisfactory seams in "glue down" wall-to-wall carpet installations. In "glue down" wall-to-wall installations, carpet is adhesively attached directly to an underlying substrate, such as a floor or other surface or to a carpet cushion which has itself been adhesively attached to a floor or other surface. This involves covering the entire surface of the substrate with an adhesive and laying the carpet into the adhesive so that the backing of the carpet bonds to the substrate. "Glue down" installations are popular because they avoid the need for stretching the carpet and are more effective for large area installations.

In order to seam carpets installed using the "glue down" method, one of two methods is generally used. The carpet seaming tape can be laid into the adhesive in the vicinity of the seam so that the backing of the carpet seaming tape is bonded to the substrate with the hot melt adhesive up. When the hot iron is moved longitudinally along the length of the carpet seaming tape to melt the hot melt adhesive, and the carpet pieces are pressed down onto the tape with the edges of the carpet pieces abutting, the seam between the carpet pieces is formed as the adhesive cools. However, the heat applied to conventional seaming tape to melt the hot melt adhesive is often sufficient to degrade the multipurpose adhesive used to bond the carpet backing to the substrate. This causes separation of the carpet from the underlying substrate in the vicinity of the seam, and results in an unsightly raised area along the length of the seam. This can be avoided by seaming the carpet first, but seaming first requires the installer to move relatively large sections of seamed carpet when coating the substrate with adhesive, an impractical and time-consuming alternative especially when large areas are to be carpeted.

Thus, the need exists for a carpet seaming tape and method of installation which permits the installation of carpets in sections and provides a strong seam between the carpet pieces in a glue down installation without promoting delamination of the carpet from the underlying substrate in the vicinity of the seam.

SUMMARY OF THE INVENTION

The present invention provides a method and an apparatus for seaming carpets which are installed using a glue down method.

In one embodiment, the present invention provides a carpet seaming tape having a paper carrier with a top and bottom surface. On the top surface of the paper carrier is bonded a reinforcing scrim on which is bonded a layer of hot melt adhesive. On the bottom surface of the paper carrier is bonded a layer of heat resistant, pressure sensitive adhesive. The pressure sensitive adhesive can be covered with a releasable film for ease of handling prior to use.

In another embodiment, the present invention provides a method of seaming carpets during glue down installations. Carpet is unrolled over the floor or other surface to be carpeted and the individual carpet pieces are fitted and cut as necessary. The carpet seaming tape of the present invention is centered along the length of abutting edges of carpet pieces where a seam is to be formed, with the releasable film covered pressure sensitive adhesive coated bottom side of the tape facing the floor, and the hot melt adhesive coated top surface facing the carpet backing. Once alignment of the carpet seaming tape is complete, the releasable film is removed and pressure is applied to the carpet seaming tape to adhere the tape to the floor. The carpet pieces are then removed, and the floor is completely coated with multipurpose liquid adhesive except where the carpet seaming tape is located. The carpet pieces are then replaced, the edges of the carpet pieces are aligned in a closely abutting relationship along the carpet seaming tape and the carpet is adhesively attached to the floor. Finally, a carpet seaming iron is used to melt the hot melt adhesive bonded to the top surface of the carpet seaming tape, and the seam is formed when the carpet pieces are pushed into the molten adhesive, with the edges of the carpet pieces being pushed into a close, abutting relationship.

In yet another embodiment, the present invention provides a carpet installation using the carpet seaming tape and method of the present invention.

DETAILED DESCRIPTION OF THE INVENTION

Figure 1:
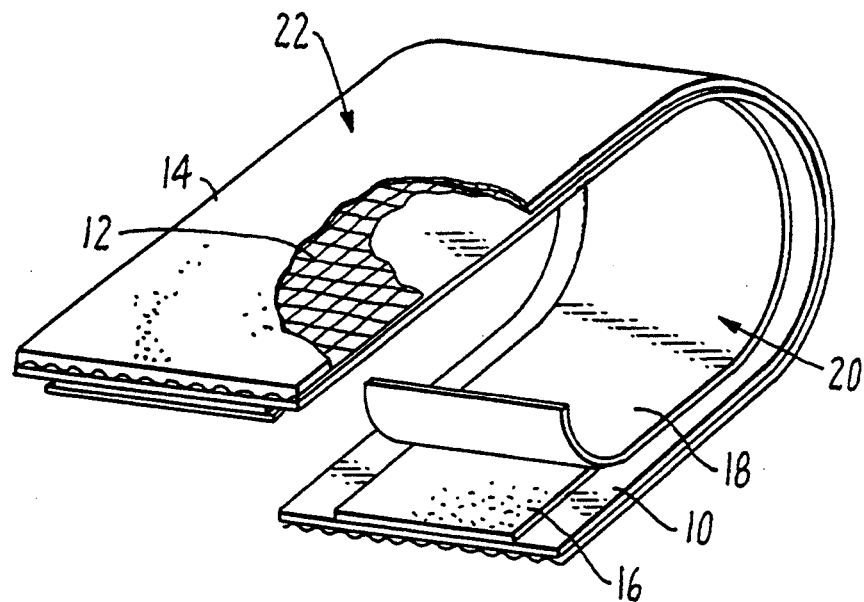
FIG. 1 is perspective view of a carpet seaming tape of the present invention showing both the front and back sides of the tape.

FIG. 1 shows a typical carpet seaming tape of the present invention. The tape includes a carrier 10 of paper or heat resistant film. A hot melt adhesive layer 14 is then bonded to the top side 22 of the carrier 10. Many types of hot melt adhesives are suitable, and described in detail in the art. For example, see U.S. Pat. No. 3,533,876 to Burgess, which is incorporated herein by reference. A reinforcing scrim 12 is preferably bonded to the top side 22 of the carrier 10 between the top side 22 and the hot melt adhesive layer 14. Such scrims are well known in the art and are constructed from fiberglass yarn, or other high strength, heat resistant yarn, fiber or mesh.

A layer of pressure sensitive adhesive 16 is bonded to the bottom side 20 of the carrier 10. This pressure sensitive adhesive 16 can be either a thermoset or thermoplasic type heat-resistant adhesive. H. B. Fuller Co. adhesive # HM 8340 was found to be satisfactory for this purpose. Pressure sensitive adhesive 16 is preferably covered by a releasable film 18 during manufacture and prior to use to permit unimpeded rolling, unrolling and handling of the tape.

Figure 2:
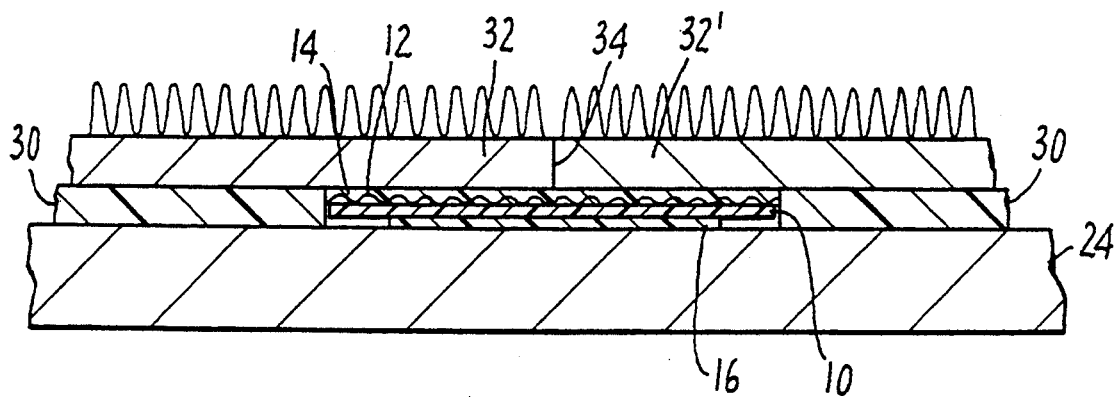
FIG. 2 is a cross-sectional view of a carpet seam produced using carpet seaming tape and method of the present invention.
Figure 3:
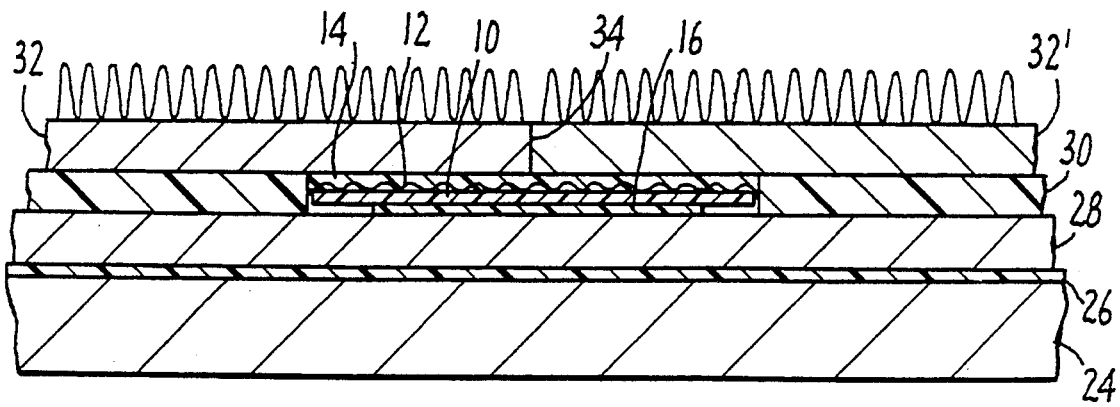
FIG. 3 is an exploded cross-sectional view of a carpet seam produced using carpet seaming tape and method of the present invention.

A typical "glue down" carpet installation is shown in FIGS. 2 and 3. The carpet is unrolled over the top of floor or other surface 24, preliminarily fitted and trimmed as necessary. It should be noted that carpets can be installed on a variety of surfaces other than floors. Thus, the term "floor" as used herein is intended to include any surface which can be carpeted using "glue down" installation methods.

After fitting and trimming of the carpet pieces 32', 32", a carpet seaming tape of the present invention is unrolled and centered along each desired seam between abutting pieces of carpet 32', 32" with the release film 18 on the floor 24. When the carpet seaming tape has been properly positioned, the release film 18 is removed and pressure is applied to the top side 22 of the carpet seaming tape to adhesively attach the tape to the floor 24. The carpet pieces 32' and 32" are then removed, and multipurpose liquid adhesive 30 is used to coat the entire surface of floor 24 to be carpeted except where the carpet seaming tape is located. Multipurpose liquid adhesives useful for adhesively installing carpets are well known in the art and include latex type adhesives such as, for example, W. W. Henry Co. No. 356 Multipurpose Flooring Adhesive.

The carpet pieces 32' and 32" are then bonded to the floor 24 by placing them on the adhesive coated floor with the abutting edges centered and aligned along the carpet seaming tape. An electric seaming iron or other means for melting the hot melt adhesive 14 can then be placed under the abutting edges of the carpet pieces 32' and 32" and moved along the length of the carpet seaming tape to melt the hot melt adhesive 14. The seam is completed by pressing the carpet pieces 32', 32" into the molten hot melt adhesive 14 with the edges of the carpet pieces 32', 32" closely abutting.

The method and apparatus of the present invention can also be used in "glue down" or "double stick" wall-to-wall carpet installations in which a carpet cushion is interposed between the carpet and the floor, as shown in FIG. 2. If a carpet cushion 28 is to be installed, then the cushion is unrolled, fitted and rough cut as necessary. The carpet cushion 28 is removed and floor 24 is completely coated with a pressure-sensitive or multipurpose liquid adhesive, and the carpet cushion is adhesively attached to the floor. More preferably, a carpet cushion is used which has a pre-applied adhesive on one side covered by a releasable film to permit handling and movement before use. This type of carpet cushion can be fitted with the release film side against the floor, cut to size and easily installed by simply rolling back the cushion a section at a time, removing the release film, replacing the section of the carpet cushion on the floor, and applying pressure to adhesively attach the cushion to the floor. The carpet is then unrolled over the top of carpet cushion 28, and the carpet pieces 32', 32" are fitted and trimmed as necessary. The carpet seaming tape of the present invention is unrolled and centered along each desired seam between the abutting pieces of carpet 32', 32" with the release film 18 facing the cushion. When the carpet seaming tape has been properly aligned, the release film 18 is removed and pressure is applied to the top side 22 of the carpet seaming tape to adhesively attach the tape to the cushion 28. The carpet pieces 32' and 32" are then removed, and multipurpose liquid adhesive 30 is used to coat the entire top surface of cushion 28 except where the carpet seaming tape is located.

The carpet pieces 32' and 32" are bonded to the cushion by placing them atop the adhesive coated cushion 28 and centering and aligning the abutting edges of the carpet pieces 32', 32" along the carpet seaming tape. An electric seaming iron can then be placed under the abutting edges of the carpet pieces 32' and 32" and moved along the length of the carpet seaming tape to melt the hot melt adhesive 14. The seam is completed by pressing the carpet pieces 32', 32" into the molten hot melt adhesive 14 with the edges of the carpet pieces 32', 32" closely abutting.

This method provides many benefits over existing methods and carpet seaming tapes presently used in "glue down" installations. Because seaming takes place after the carpet is adhesively attached to the floor or other surface, the installer is not forced to manipulate larger seamed pieces of carpet as he would if the carpet were seamed before adhering the carpet to the floor. Thus, no large, seamed pieces need be manipulated. Further, because the seaming tape is adhesively attached to the floor before seaming, its position or alignment cannot change or slide laterally during the seaming operation as it can when conventional seaming tapes are used. For an explanation of this problem, see, for example, U.S. Pat. No. 3,972,768 to Hill, Col. 1, 11. 35-55. Thus, when an installer uses the carpet seaming tape and method of the present invention, he need only concentrate on the position of the seaming iron and on pushing the carpet pieces 32', 32" into the adhesive 14 while the adhesive 14 is molten, with the carpet pieces 32', 32" in a close, abutting relationship. Finally, use of the carpet seaming tape of the present invention insures that the seam will remain adhesively attached to the floor or other surface and will not separate from the floor or other surface after seaming.

One skilled in the art will recognize that it would be possible to construct the elements of the present invention from a variety of materials and to modify the placement of the components in a variety of ways. While the preferred embodiments have been described in detail and shown in the accompanying drawings, it will be evident that various further modifications are possible without departing from the scope of the invention as embodied in the claims.

I claim:

1. A carpet seaming tape for use in creating seams in carpets installed by adhesive attachment directly to a floor or other surface to be carpeted, said carpet seaming tape comprising:
   an imperforate carrier means having a top surface and a bottom surface;
   a layer of hot melt adhesive bonded to the top surface of said carrier;
   a layer of pressure sensitive adhesive bonded to the bottom surface of said carrier, said pressure sensitive adhesive characterized in that it is not substantially affected by exposure to heat sufficient for melting said hot-melt adhesive.

2. The carpet seaming tape of claim 1 in which said carrier is comprised of paper.

3. The carpet seaming tape of claim 2 additionally comprising a scrim.

4. The carpet seaming tape of claim 3 in which said scrim is located between the top surface of said carrier and said layer of hot melt adhesive.

5. The carpet seaming tape of claim 1 additionally comprising a releasable film covering said pressure sensitive adhesive.

6. A carpet seaming tape for use in creating seams in carpets installed by adhesive attachment directly to a surface to be carpeted, said carpet seaming tape essentially comprising:
   a carrier means having a top surface and a bottom surface;
   a layer of hot melt adhesive coating the top surface of said carrier;
   a reinforcing scrim interposed between the top surface of the carrier means and the layer of hot melt adhesive;
   a layer of heat-resistant pressure sensitive adhesive coating substantially the entire bottom surface of the carrier means; and,
   release film means for covering the layer of pressure sensitive adhesive until the tape is adhered to the surface to be carpeted.

7. The carpet seaming tape of claim 6 in which said carrier is paper.

8. The carpet seaming tape of claim 6 in which said scrim is constructed from fiberglass yarn.

9. The carpet seaming tape of claim 6 in which said release film means is a separate sheet which is substantially the same size as the carrier.

10. A carpet seaming tape for use in creating a seam between two abusing pieces of carpet and for attaching the entire seam region directly to a surface to be carpeted, said carpet seaming tape essentially comprising:
    a carrier means having a top surface and a bottom surface;
    a layer of hot melt adhesive coating the top surface of said carrier for forming the seam;
    a reinforcing scrim interposed between the top surface of the carrier means and the layer of hot melt adhesive for reinforcing the seam;
    a layer of heat-resistant pressure sensitive adhesive coating substantially the entire bottom surface of the carrier means for attaching the seam to the surface to be carpeted along substantially the entire length of the seam; and,
    a release film means for covering the layer of pressure sensitive adhesive until the tape is adhered to the surface to be carpeted.

11. The carpet seaming tape of claim 10 in which the carrier means is paper.

12. The carpet seaming tape of claim 10 in which the scrim is constructed from a fiberglass yarn.

13. The carpet seaming tape of claim 10 in which the release film means is a separate sheet which is substantially the same size as the carrier means.

14. A carpet seaming tape comprising:
    a carrier means having a top surface and a bottom surface;
    a first adhesive means for forming a permanent seam between two abutting carpet edges, said first adhesive means comprising a layer of hot melt adhesive on the top surface of said carrier, said hot melt adhesive characterized in that it can be melted by exposure to heat generated by a carpet seaming iron;
    a second adhesive means for bonding the seam to a surface to be carpeted, said second adhesive means comprising a continuous layer of pressure sensitive adhesive on the bottom surface of the carrier means, said pressure sensitive adhesive characterized in that it is not substantially affected by exposure to heat sufficient for melting said hot-melt adhesive; and,
    release film means for covering the layer of pressure sensitive adhesive until the tape is adhered to the surface to be carpeted.

15. The carpet seaming tape of claim 14 additionally including a reinforcing scrim interposed between the carrier and one of the two adhesive means.

16. The carpet seaming tape of claim 15 in which said scrim is interposed between the top surface of the carrier means and the first adhesive means.

17. The carpet seaming tape of claim 16 in which said scrim is constructed from fiberglass yarn.

18. The carpet seaming tape of claim 14 in which said carrier is paper.

19. The carpet seaming tape of claim 14 wherein the second adhesive means is formed as a substantially planar, continuous layer.

20. The carpet seaming tape of claim 19 wherein the first adhesive means is formed as a substantially planar, continuous layer.

* * * * *

UNITED STATES PATENT AND TRADEMARK OFFICE
CERTIFICATE OF CORRECTION

PATENT NO. : 5,376,419

DATED : December 27, 1994

INVENTOR(S) : SCOTT L. FOSTER *ET AL.*

It is certified that error appears in the above-identified patent and that said Letters Patent is hereby corrected as shown below:

In Claim 6, column 5, line 36 and Claim 10, column 6, line 4, the words "heat resistant" should be deleted.

The language --, said pressure sensitive adhesive characterized in that it is not substantially affected by exposure to heat sufficient for melting said hot-melt adhesive-- should be added at column 5, line 38 of Claim 6 between "means" and ";" and at column 6, line 8 in Claim 10 between "seam" and ";".

Signed and Sealed this

Fourth Day of April, 1995

Attest:

BRUCE LEHMAN

Attesting Officer

Commissioner of Patents and Trademarks